May 1, 1923.

J. T. SENTROP, JR 1,453,326

MOTOR AND OTHER CYCLE

Original Filed Feb. 8, 1918    2 Sheets-Sheet 1

INVENTOR
J. T. Sentrop, Jr.
BY ATTORNEY

May 1, 1923. 1,453,326

J. T. SENTROP, JR

MOTOR AND OTHER CYCLE

Original Filed Feb. 8, 1918  2 Sheets-Sheet 2

INVENTOR
J. T. SENTROP, Jr.
BY ATTORNEY

Patented May 1, 1923.

1,453,326

UNITED STATES PATENT OFFICE.

JOHANNES TH. SENTROP, JR., OF MONTREAL, QUEBEC, CANADA.

MOTOR AND OTHER CYCLE.

Original application filed February 8, 1918, Serial No. 216,114. Divided and this application filed December 13, 1918, Serial No. 266,627. Renewed August 29, 1921. Serial No. 496,754.

*To all whom it may concern:*

Be it known that I, JOHANNES THEODORES SENTROP, Junior, a subject of the Queen of Holland, and resident of the city of Montreal, Province of Quebec, Canada, have invented certain new and useful Improvements in Motor and Other Cycles, and do hereby declare the following to be a full, clear, and exact description of same.

This invention covering a divisional part of my application Serial No. 216,114 filed February 8, 1918, relates to saddles for motorcycles and the like and appertains to the particular construction and attachments therefor.

The object of my invention is to provide a saddle that through its mountings will overcome all strains caused by the sudden jolting of the cycle when in motion.

A further object is to provide means whereby the saddle through its mountings will slide longitudinally of the frame in compensation for the longitudinal jerks to which the cycle is subjected when in motion.

The above with further objects and advantages will be hereinafter more fully described and particularly pointed out in the appended claims.

For full comprehension, however, of my invention reference should be had to the accompanying drawings forming a part of this specification in which the same reference characters indicate the same parts and wherein.

Figure 1:
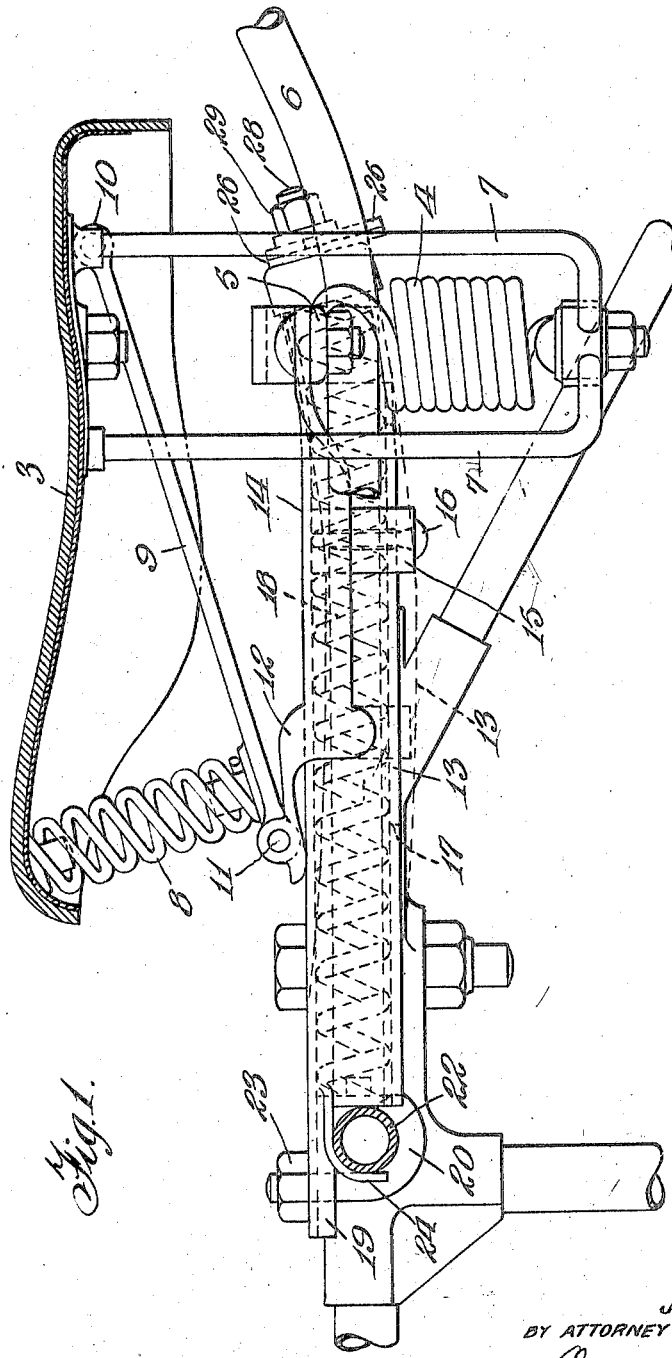
Fig. 1 is a side elevation of my improved saddle partly in section.
Figure 2:
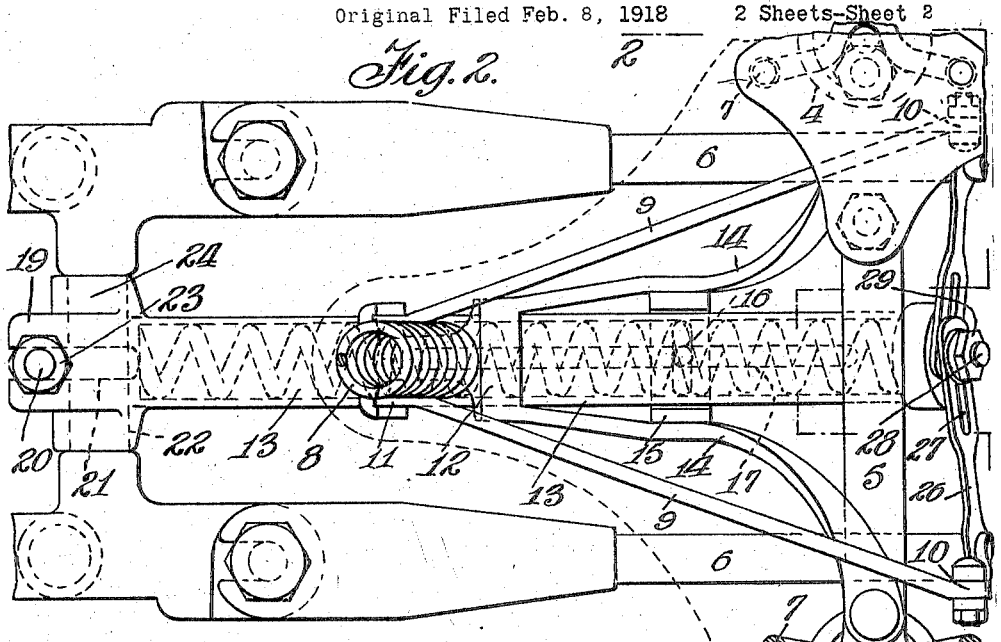
Fig. 2 is a plan view thereof, partly in section.
Figure 3:
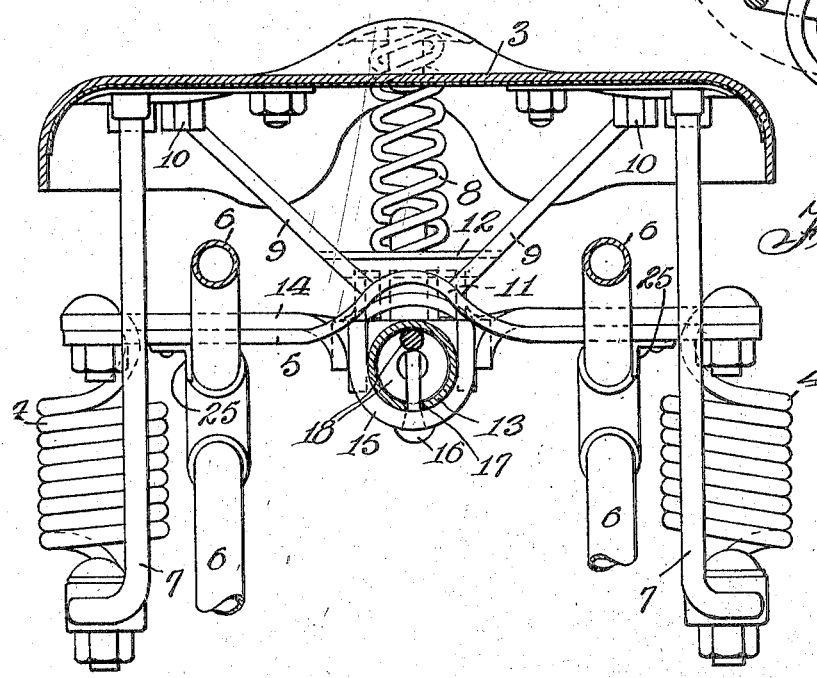
Fig. 3 is a sectional view on line 2—2, Fig. 2.

Referring now to the drawings, 2 indicates a saddle mounted upon a longitudinally disposed member, such as a tube, as illustrated, carried by the cycle frame in a manner to slide longitudinally of the frame in compensation for the longitudinal jerks to which the cycle may be subjected when in motion. This saddle proper is located preferably just in the rear of the centre portion of the cycle frame and consists of a seat 3 yieldingly supported at the rear by coiled springs 4 suspended from the opposite ends of a cross-bar 5 spanning the space between top bars 6 of the cycle frame and yieldingly suspending arms 7 depending from the saddle on opposite sides of the frame section and connected to the lower ends of the springs. The front portion of the seat is yieldingly supported by a double coiled spring 8 bearing upon the front ends of a pair of links 9 which are respectively pivoted at 10 to the underside of the seat at the rear, extend forwardly and converge to a central point where they are pivoted at 11 upon the top of a shoe 12 slidably mounted upon the top of the tube 13 carried by the frame longitudinally between the bars 6 and beneath cross-bar 5, to which latter rearwardly extending diverging arms 14 of the shoe are fastened.

The arms 14 carry a strap 15 which straddles beneath the tube 13 and carries a pin 16 which extends into the tube through a longitudinal slot 17 in the bottom of the latter, and engages a coiled spring 18 within the tube and bearing between the ends of the latter.

The link connection 9 enables the seat to be depressed and the springs 4 and 8 provide an even yielding resistance, the latter being of sufficient strength to prevent forward tilting of the saddle seat and engagement with the frame while the slot 17 is of sufficient length to permit of a forward movement of the saddle carrying members when jolts etc. occur, the spring 18 yieldingly resisting and thus cushioning the forward movement and subsequently returning the saddle carrying members to normal position.

If desired the spring 18 may be omitted and the tube curved downwardly as shown in dotted lines Fig. 1 to facilitate the return of the saddle and its carrying members to normal position.

The member or tube 13 is preferably pivoted at its front end to the frame to enable the saddle being swung up out of the way when the sides of the rear section are to be swung out, for the purpose, for instance, of dismounting or mounting a wheel this pivotal connection being formed by a flat front extension 19 of the member or tube and a J-bolt 20. The end of the tube 13 abuts a cross bar 22 of the frame of the cycle the flat extension of the tube being slotted at 21 and placed over a cross bar 22 of the frame section of the cycle while the bolt is hooked beneath said cross bar, passed into the slot 21 and secured by a nut 23, the hook of the J-bolt 20 and depending curved side margins 24 of the flat extension 19 enveloping the cross bar 22 and forming the pivotal connection.

The saddle and carrying members are normally prevented from swinging by angle irons 25 secured to the outer sides of the frame and the cross bar of the saddle and also by means of links 26 which are bifurcated at their outer ends to engage the bars 6 and slotted at 27 at their inner ends to take over a threaded stud 28 upon the rear end of the tube. A nut 29 upon the stud holds the links in position engaging the bars 6 and can be loosened to enable such links to be moved inwardly, through the medium of their slots, out of engagement with the bars.

What I claim is as follows:

1. In a cycle, a frame, a tube carried by the frame, a saddle and saddle carrying members mounted upon the tube the latter being pivoted at one end to the frame, such saddle carrying members being slidable longitudinally of the tube, springs supporting the rear portion of the saddle, a cross-bar having the springs suspended therefrom, arms depending from the saddle on opposite sides of the frame and connected to the lower ends of said springs, a double coiled spring supporting the front portion of the saddle and a pair of links forming a bearing for said double coiled spring at the front of the saddle, such links being pivotally connected to the underside of the saddle at the rear and extending forwardly and converging to a central point on the tube.

2. In a cycle, a frame, a longitudinally disposed tube carried by the frame, a saddle and saddle carrying members mounted upon the tube the latter being pivoted at one end to the frame, such saddle carrying members being slidable longitudinally of the frame, springs supporting the rear portion of the saddle, a cross-bar secured to the cycle frame and having the springs suspended therefrom, arms depending from the saddle on opposite sides of the frame and connected to the lower ends of said springs, a double coiled spring supporting the front portion of the saddle, a pair of links forming a bearing for said double coiled spring at the front of the saddle, said links being pivotally connected to the underside of the saddle at the rear and extending forwardly and converging to a central point on the tube, a shoe slidably mounted upon the top of the tube and having the links pivotally mounted thereto, and rearwardly extending diverging arms of the shoe formed integral therewith and connected to the cross-bar on the frame.

3. In a cycle, a frame, a longitudinally disposed tube carried by the frame, a saddle and saddle carrying members mounted upon the tube the latter being pivoted at one end to the frame, such saddle carrying members being slidable longitudinally of the frame, springs supporting the rear portion of the saddle, a cross-bar secured to the cycle frame and having the springs suspended therefrom, arms depending from the saddle on opposite sides of the frame and connected to the lower ends of said springs, a double coiled spring supporting the front portion of the saddle, a pair of links forming the bearing for said double coiled spring at the front of the saddle, said links being pivotally connected to the underside of the saddle at the rear and extending forwardly and converging to a central point on the tube, a shoe slidably mounted upon the top of the tube and having the links pivotally connected thereto, rearwardly extending diverging arms of the shoe formed integral therewith and connected to the cross bar on the frame, a strap carried by said arms which straddles beneath said tube, a pin carried by said strap extending into the tube, and a coiled spring within the tube and bearing between the ends of the latter, such pin engaging with the coiled spring within said tube.

4. In a cycle, a frame, a tube mounted upon said frame and pivoted at one end thereto, a saddle and saddle carrying members mounted upon the tube, a flat front extension of said tube formed integral therewith, a cross-bar formed on the frame and abutting the end of the tube, said flat front being slotted and placed over the cross-bar, curved side margins formed in one with the flat extension and at each side thereof, such curved side margins being placed over the cross-bar, and means for securing said side margins to the cross-bar.

5. In a cycle, a frame, a tube mounted upon said frame, and pivoted at one end thereto, a saddle and saddle carrying members mounted upon the tube, a flat front extension of said tube formed integral therewith, a cross-bar formed on the frame against which the end of the tube abuts, said flat front extension being slotted and placed over the cross-bar, curved side margins formed in one with the flat extension and at each side thereof, such curved side margins being placed over the cross-bar, a J-bolt passed into the slot of the flat extension and hooked beneath said cross-bar and a nut for securing said bolt in place.

6. In a cycle, a frame, a bar connecting the opposite sides of the frame, a tube mounted upon said frame and pivoted at one end to the said bar, a saddle and saddle carrying members mounted upon the tube, angle irons and links preventing the swinging of the saddle, such angle irons being secured to the outer sides of the frame and the cross bar of the saddle, the outer ends of said links being bifurcated to engage the frame bar and also slotted at their inner ends to engage with the rear end of the tube through a threaded stud having the slotted end of the links passed thereon and a nut upon the stud to hold the links in position.

7. A cycle frame, in combination with a saddle and saddle carrying members, such saddle carrying members being slidable longitudinally of the frame, springs supporting the rear portion of the saddle, a cross-bar secured to the cycle frame and having said springs suspended therefrom, arms depending from the saddle on opposite sides of the frame and connected to the lower ends of said springs, a double coiled spring supporting the front portion of the saddle, a pair of links forming the bearing for said double coiled springs at the front of the saddle, said links being pivotally connected to the underside of the saddle at the rear and extending forwardly and converging to a central point, a tube carried by the frame longitudinally between the top frame bars and beneath said cross bar, a shoe slidably mounted upon the top of said tube and having the links pivotally connected thereto, rearwardly extending diverging arms of the shoe formed integral therewith and connected to the cross bar on the frame, a strap carried by said arms which straddles beneath said tube, a pin carried by said strap which extends into the tube, a coiled spring within the tube and bearing between the ends of the latter, such pin engaging with the coiled spring within said tube, a flat front extension of said tube formed integral therewith, a cross-bar formed on the frame against which the end of the tube abuts, said flat front extension being slotted and placed over the cross-bar, curved side margins formed in one with the flat extension and at each side thereof, such curved side margins being placed over the cross-bar, a J-bolt passed into the slot of the front extension and hooked beneath said cross-bar, a nut for securing said bolt in place, angle irons and links, preventing the swinging of the saddle such angle irons being secured to the outer sides of the frame and cross bar of the saddle and the links mounted at the rear of the tube the outer ends of said links being bifurcated to engage the cycle frame bars and also slotted at their inner ends to engage with the rear end of the tube through a threaded stud having the slotted ends of the links passed thereon and a nut upon the stud to hold the links in position.

In testimony whereof, I have signed my name to this specification.

JOHANNES TH. SENTROP, Jr.